(12) United States Patent
Engdegard

(10) Patent No.: US 9,326,082 B2
(45) Date of Patent: Apr. 26, 2016

(54) SONG TRANSITION EFFECTS FOR BROWSING

(75) Inventor: Jonas Engdegard, Stockholm (SE)

(73) Assignee: Dolby International AB, Amsterdam, Zuidoost (NL)

(*) Notice: Subject to any disclaimer, the term of this patent is extended or adjusted under 35 U.S.C. 154(b) by 308 days.

(21) Appl. No.: 13/995,780

(22) PCT Filed: Dec. 15, 2011

(86) PCT No.: PCT/EP2011/006346
§ 371 (c)(1),
(2), (4) Date: Jun. 19, 2013

(87) PCT Pub. No.: WO2012/089313
PCT Pub. Date: Jul. 5, 2012

(65) Prior Publication Data
US 2013/0282388 A1 Oct. 24, 2013

Related U.S. Application Data

(60) Provisional application No. 61/428,554, filed on Dec. 30, 2010, provisional application No. 61/470,604, filed on Apr. 1, 2011.

(51) Int. Cl.
H04H 60/04 (2008.01)
G11B 27/34 (2006.01)
(Continued)

(52) U.S. Cl.
CPC ............. *H04S 1/00* (2013.01); *G10H 1/0008* (2013.01); *G11B 27/038* (2013.01);
(Continued)

(58) Field of Classification Search
CPC .............. G10H 2210/136; G10H 2210/125; G10H 2210/131
USPC ........................................................ 381/119
See application file for complete search history.

(56) References Cited

U.S. PATENT DOCUMENTS

| 5,747,716 A | 5/1998 | Matsumoto |
| 6,933,432 B2 | 8/2005 | Shteyn |

(Continued)

FOREIGN PATENT DOCUMENTS

| GB | 2464545 | 4/2010 |
| WO | 2008/045733 | 4/2008 |

(Continued)

OTHER PUBLICATIONS

Jochelson, D. et al, "Design of an Automatic Beat-Matching Algorithm for Portable Media Devices", AES Convention, Oct. 2006.

(Continued)

*Primary Examiner* — Paras D Shah
*Assistant Examiner* — Forrest F Tzeng

(57) ABSTRACT

In one aspect, a method of providing directive transitions between audio signals comprises associating a first/second browsing direction (A1, A2) with a first/second transition effect template. In response to a browsing action in one of said browsing directions, a transition is played in which an exit segment (S0-out1, S0-out2) and an entry segment (S1-in, S2-in) are mixed in accordance with the associated transition effect template. A further aspect proposes a method of transitioning between audio signals decoded from audio data including time markers encoded as audio metadata and indicating at least one section of the respective audio signal. The method includes retrieving time marking information in the audio data; extracting an exit segment (S0-out1, S0-out2) and an entry segment (S1-in, S2-in), wherein an endpoint of at least one of the segments is synchronized with a time marker; and playing a transition in which the exit and entry segments are mixed in accordance with a transition effect template.

22 Claims, 7 Drawing Sheets

(51) Int. Cl.
*G11B 27/028* (2006.01)
*H04S 1/00* (2006.01)
*G10H 1/00* (2006.01)
*G11B 27/038* (2006.01)
*H04S 7/00* (2006.01)

(52) U.S. Cl.
CPC ... *G10H 2210/125* (2013.01); *G10H 2210/131* (2013.01); *G10H 2210/136* (2013.01); *H04H 60/04* (2013.01); *H04S 7/30* (2013.01); *H04S 2400/11* (2013.01)

(56) References Cited

U.S. PATENT DOCUMENTS

| | | | |
|---|---|---|---|
| 7,034,217 B2 | 4/2006 | Pachet | |
| 7,189,913 B2 | 3/2007 | Moulios | |
| 7,220,911 B2 | 5/2007 | Basu | |
| 7,424,117 B2 | 9/2008 | Herberger | |
| 7,425,674 B2 | 9/2008 | Moulios | |
| 7,525,037 B2 | 4/2009 | Hansson | |
| 8,587,528 B2 * | 11/2013 | Chaudhri | G06F 3/0482 345/173 |
| 2003/0183064 A1 * | 10/2003 | Eugene et al. | G10H 1/0033 84/609 |
| 2005/0047614 A1 * | 3/2005 | Herberger et al. | H04H 60/04 381/119 |
| 2007/0074117 A1 | 3/2007 | Tian | |
| 2007/0076547 A1 | 4/2007 | Rahman | |
| 2007/0261535 A1 | 11/2007 | Sherwani | |
| 2007/0291958 A1 * | 12/2007 | Jehan | G06N 99/005 381/103 |
| 2008/0086687 A1 * | 4/2008 | Sakai et al. | G06F 3/04812 715/716 |
| 2008/0147214 A1 | 6/2008 | Lee | |
| 2008/0190267 A1 * | 8/2008 | Rechsteiner et al. | 84/609 |
| 2008/0221895 A1 * | 9/2008 | Pauws et al. | 704/270 |
| 2008/0249644 A1 | 10/2008 | Jehan | |
| 2009/0049979 A1 * | 2/2009 | Naik et al. | 84/636 |
| 2009/0259326 A1 * | 10/2009 | Pipitone et al. | G10H 1/0025 700/94 |
| 2010/0168881 A1 | 7/2010 | Weber | |
| 2010/0215195 A1 * | 8/2010 | Harma et al. | H04S 1/007 381/119 |
| 2011/0231426 A1 * | 9/2011 | Fejta et al. | G11B 27/038 707/769 |
| 2012/0197650 A1 | 8/2012 | Resch | |
| 2013/0290818 A1 * | 10/2013 | Arrasvuori | H04N 21/4383 715/201 |

FOREIGN PATENT DOCUMENTS

| | | |
|---|---|---|
| WO | 2008/0129443 | 10/2008 |
| WO | 2012/091938 | 7/2012 |

OTHER PUBLICATIONS

Jochelson, D. et al, "Design of a Flexible Crossfade/Level Controller Algorithm for Portable Media Platforms", AES Convention, Oct. 2007.

Fazekas, G. et al, "Intelligent Editing of Studio Recordings with the Help of Automatic Music Structure Extraction", AES Convention, May 2007.

* cited by examiner

SONG TRANSITION EFFECTS FOR BROWSING

TECHNICAL FIELD

The invention disclosed herein generally relates to audio signal processing. It more precisely relates to methods and devices for transitioning between audio signals using transition effects that are susceptible to carry directive information to the listener. In particular, the transition effects may be in concord with the temporal structure of the audio content.

BACKGROUND OF THE INVENTION

In online media services, standalone music players and other products for reproducing audio content, the switching between two audio signals may or may not be marked out by an audible transition feature. For example, U.S. Pat. No. 7,424,117 B2 discloses a method of creating an illusion of motion when transitioning between two songs are played back in a multi-channel system. Existing ways of transitioning between signals are not always very helpful to the listener and may even be experienced as detrimental to the total listening experience. Some approaches may for instance involve joining two songs with no regard to differences in tempo, key, beat number etc. Since the listener is likely to remain mentally in the musical context of the previous song during an initial portion of the next song, (s)he may perceive this portion less attentively. The mental refocusing process that takes place during this portion may also involve some discomfort.

SUMMARY OF THE INVENTION

It is an object of the present invention to enable transitions between audio signals that are more appealing or at least neutral to the total listening experience. A first particular object is to propose transitions that can be used to provide useful guidance to the listener, especially directive transitions. A second particular object is to propose transitions more in concord with the structure of the audio content than certain available transitions. For instance, it is desirable to enable such transitions to be positioned in an integrated fashion in view of the temporal structure of a piece of music.

To this end, the invention proposes methods and devices for transitioning between audio signals in accordance with the independent claims. The dependent claims define advantageous embodiments of the invention.

As used herein, an audio signal is a pure audio signal or an audio component of a video signal or other compound signal. An audio signal in this sense may be in the form of a finite signal portion, such as a song, or may be a streaming signal, such as a radio channel. An audio signal may be encoded in audio data, which may be arranged in accordance with a predetermined format which—in addition to waveform data, transform coefficients and the like—includes audio metadata useful for the playback of the signal. Metadata associated with a song that is distributed as a file may also be supplied from an external database. A finite audio signal portion may be encoded as a computer file of a well-defined size, whereas a streaming signal may be distributed over a packet-switched communications network as a bitstream or distributed over an analogue or digital broadcast network. For the purposes of this specification, a song may refer to a unit in which digital audio content is distributed and/or filed in a digital library. It may relate to a piece of vocal or non-vocal music, a segment of speech or other recorded or synthetic sounds. One song in this sense may present an internal structure including at least one section, which may be a verse, refrain, chorus or the like. The structure may be a temporal structure but may also correspond to a listener's perception of the song, the (first) occurrence of singing or a certain instrument, or to its semantic content. For instance, one may identify sections in a spoken radio program on the basis of the topics discussed, possibly in real time. A plurality of songs in this sense may be grouped into an album (or record), and a plurality of albums may form a collection. Furthermore, the adjective directive is sometimes used broadly as a synonym of 'guiding'. In some instances, it may also be employed in a narrower sense, where it may mean 'referring to a direction', 'associated with a direction' or the like. A direction in this sense may be one-dimensional (the property of being forward/backward, upward/downward, positive/negative etc.) or many-dimensional, including spatial directions.

In a first aspect of the invention, a method of providing directive transitions includes associating a first browsing direction, for transitioning from a current audio signal to a first alternative audio signal, with a first transition effect template; and associating a second browsing direction, for transitioning from a current audio signal to a second alternative audio signal, with a second transition effect template, which is perceptually different from the first transition effect template. When a browsing action in one of said browsing directions is performed, the method further includes playing a transition, in which an exit segment, extracted from the current audio signal, and an entry segment, extracted from the alternative audio signal, are mixed in accordance with the associated transition effect template. After this, the alternative audio signal is played from the end of the entry segment.

This first aspect also relates to a decoder adapted to perform each step of the method.

This aspect achieves the object of providing useful guidance to a listener, since different browsing actions are associated with perceptually distinguishable transitions. This is to say, the templates are so different in objective terms, that they are auditorily distinguishable. By identifying transitions of different types, the user is notified during the transition of whether the entity (e.g., a music player) playing the audio signal is effecting an transition in the first or second direction, which is an internal state of the entity. After the transition has been accomplished—possibly by combining the information on the browsing direction with knowledge of an ordered relationship between the available audio signals—the user is able to derive the identity of the alternative audio signal that the entity is playing. Hence, the invention provides for automatic indications about conditions prevailing in the entity playing the audio signal. This arrangement may help the listener to use a visual browsing interface for navigating among audio signals or may help replace such interface by non-visual means. Where the transitions are not commanded by the listener, (s)he may also receive useful information by hearing whether a transition takes place in a forward or a backward direction referring to some physical entity that is not necessarily related to the audio content as such, e.g., auditory traffic signals, elevator announcements and various applications in the entertainment field. Finally, transitions that are based on mixing the material playing are likely to be perceived as more agreeable than, for instance, transitions involving a synthetic voice overlay for conveying the same information.

A transition effect template is used for generating a transition on the basis of the exit and entry segments. The template may contain information regarding the length of each segment. The template may further control how the segments are to be mixed, such as by specifying the power at which each segment is to be played back on the different channels, possibly in a time-dependent manner (e.g., fade in, fade out), by specifying effects to be applied (e.g., simulated motion, simulated Doppler effect, stereo regeneration, spectral band replication, reverberation) or by specifying predetermined content to be superposed (overlaid) on top of the signal generated from the entry and exit segments.

In particular, one or both transition effect templates may comprise a channel power distribution to be used for the entry and/or exit segments. In other words, each transition effect template may include two channel power distributions, an exit channel distribution and an entry channel distribution, to be applied to the respective segments. The channel power distribution may be time-invariant or time-variant, as will be explained below. It is particularly advantageous to include a time dependence when playback takes place over a single channel. Where several playback channels exist and first transition effect template has been defined, a second transition effect template can be automatically generated by permuting the power distribution coefficients among the channels within each of the exit and entry channel power distributions. In particular, if the playback channels are spatially arranged, such as with respect to a left/right and/or a forward/backward direction, the permutation may correspond to a reflection of the channels in one or more of these directions, e.g., by letting coefficients for right and left channels trade places but leaving the centre channel unchanged. This saves time for the designer, who may conveniently generate a large number of transition effect templates. The symmetry may also have a self-explanatory effect on the listener, so that (s)he realizes that the first and second transition effect templates are related but different.

A useful class of transition effect templates can be defined in connection with stereophonic playback over two or more channels, which is generally known to be able to create an illusion of locality, directivity or movement. The first transition effect template is obtainable by simulating a movement of the audio source playing the exit segment or the entry segment in a first spatial direction relative to the intended listening point. Optionally, both the exit-segment audio source and the entry-segment audio source may be moving. This may entail using a time-dependent channel power distribution, creating a time-dependent time difference (or phase difference) between channels, or the like. The second transition effect template may then correspond to a simulated movement of the same or, preferably, the other audio source in a second, different direction. The first and second directions are perceptually distinguishable and may for example be opposite one another.

In a further development of the first aspect, a third browsing direction is defined and associated with a third transition effect template, which is perceptually different from the first and second transition effect templates. As an example, if the first and second browsing directions refer to the up and down directions in a list of songs in an album, the third browsing direction may correspond to jumping to a different album in a library. This concept may readily be generalized to also comprise a fourth browsing direction, a fifth browsing direction etc.

A second aspect of the invention relates to a method of providing a transition between a current and an alternative audio signal decoded from audio data, wherein the audio data include time markers encoded as audio metadata and indicating at least one section of the respective audio signal. The method includes retrieving time marking information in the audio data and extracting an exit segment from the current audio signal and an entry segment from the alternative audio signal, wherein an endpoint of at least one of the segments is synchronized with a time marker. The method then includes playing a transition, in which the exit segment and the entry segment are mixed in accordance with a transition effect template, and subsequently playing (in online or offline mode) the alternative audio signal from the end of the entry segment.

The second aspect also relates to a decoder adapted to perform each of the above steps. In either aspect, the decoder may be integrated into some other device, such as a computer, media processing system, mobile telephone or music player. Methods in accordance with the invention may also be performed by processing means provided in a different setting, such as an online music service.

It is recalled that a section may be a verse, chorus, refrain or similar portion of an audio signal. For the purposes of the claims within the second aspect, an endpoint may be either an initial endpoint or a final endpoint. Said synchronization includes aligning the endpoint and marker in time, by letting them either coincide or define a predetermined time interval. The second aspect achieves the object of providing useful guidance because it is possible to enter the alternative signal at a section of interest, such as the chorus of a song or the announcement of contents in a spoken radio program, to make browsing more efficient. Indeed, a piece of music can be often identified by hearing to a characteristic part, such as the chorus or the refrain of the piece of music. Also, hearing a characteristic part of the piece of music may be sufficient for a music consumer to determine whether (s)he likes or dislikes the piece. When a music consumer seeks the characteristic part of a piece of music stored as digital audio data when using prior-art technology, (s)he manually has to fast-forward within the piece to find the characteristic part, which is cumbersome. Thus, whether the characteristic part refers to a piece of music or audio material of a different type, it acts as an audio thumbnail of the piece. Further, transitions in accordance with the second aspect can also be accommodated into the content more seamlessly by avoiding abrupt or unrhythmic joining of two songs. This possibility can be used to enhance the listening experience.

The synchronization may consist in extracting the segment from the respective audio signal in such manner that an endpoint coincides in time with a time marker. This way, an entry or exit segment begins or ends at a time marker, which may in turn denote the beginning or end of a section of the audio signal.

The entry and/or exit segment may also be extracted in such manner that it is located some time distance away from a time marker. This allows an upbeat, an intro section, a bridge section, a program signature, a fade-in/fade-out effect or the like to be accommodated. On the one hand, a segment endpoint may be located some distance before a time marker indicating the beginning of a section of the audio signal. If the endpoint refers to an entry segment, then a corresponding transition effect template may include gradually increasing the playback volume up to the beginning of the indicated section, preferably a chorus, which introduces the section without interfering unnecessarily with the content. On the other hand, a segment endpoint may be located some distance after a time marker indicating an end of a section. Similarly, this allows for a smooth fade-out effect initiated at or around the final endpoint of the section.

A time marker may delineate sections of an audio signal but may alternatively refer to beats, so that a the transitions can be given an enhanced rhythmic accuracy. Time markers referring to sections may also be aligned with beat markers or with a beat grid before they are utilized for providing transition effects.

In embodiments of the second aspect of the invention, the time markers indicate endpoint of representative segments extracted by the methods disclosed in the applicant's co-pending Provisional U.S. Patent Application No. 61/428,554 filed on 30 Dec. 2010, as well as any related application claiming its priority, which are hereby incorporated by reference in their entirety. The combination of these teachings and the second aspect of the present invention enables browsing directly between representative sections of the audio signals, which saves the listener time and helps him or her retain focus.

In embodiments of the second aspect of the invention, the time markers may be encoded in one or more header sections of the audio data in the format disclosed in the applicant's co-pending Provisional U.S. Patent Application No. 61/252,788 filed on 19 Oct. 2009, as well as any related application claiming its priority, which are hereby incorporated by reference in their entirety. The encoding formats described therein advantageously package the information together with the waveform data or transform coefficients themselves. Such joint distribution of the audio data in a standalone format provides robustness and uses both transmission bandwidth and storage space efficiently.

In both the first and second aspect, irrespective of the number of playback channels, transition effect templates can be defined by simulating a movement of a virtual audio source playing the exit segment and/or the entry segment relative to the intended listening point. The simulation may be based on a model for sound wave propagation; such models are widely known in the art. The movement of the virtual source may follow a straight line or be curvilinear and may be illustrated by using a time-variable channel power distribution, creating a phase difference between channels and the like. The simulation may in particular illustrate how the virtual audio source travels between different locations in a changing acoustic landscape, which may include closed or semi-closed reverberating spaces defined by walls and differing, possibly, by their volumes, shapes or wall reflectivity values. This enables transition effects that human listeners may associate with the appearing or disappearing of an audio source on the listening scene. As the reverberating spaces may not be sharply delimited and the virtual audio source may be located at variable distance to the walls on its motion path, there may be a gradual change over time in the reverberation properties, particularly the dry-to-wet signal ratio, i.e., the ratio between direct and reverberated signal level. As such, the beginning of the entry or exit segment may be subjected to reverberation processing based on a different set of parameter values than the end of the same segment, wherein the change between these is gradual and continuous. Another advantageous type of transition effects includes (simulated) Doppler shifts, which may be used to illustrate a constant or variable motion velocity of a virtual audio source. Doppler shifts may be simulated by non-uniform, dynamic re-sampling of an audio signal, so as to achieve a (variable) time stretch. Advanced re-sampling methods are well-known by those skilled in the art and may include spline or Lagrange interpolation, or other methods.

Furthermore, embodiments of the invention adapted for use with stereophonic playback equipment may also include a transition effect template that applies a different channel power distribution for the exit segment than for the entry segment. One or both channel power distributions may be time variable. The distribution(s) may also be obtainable by moving a virtual audio source, which plays the concerned segment, in a spatial direction relative to a listener. Such simulated movement may entail a change in impact angle, stereo width (if the virtual audio source is a stereo source and has more than one channel), attenuation, directivity etc.

Transition effect templates based on any of the concepts discussed above may be developed further by addition (superposition) of a previously obtained audio segment. The previously obtained audio segment is thereby combined with the entry and exit segments by mixing. The segment to be added is preferably independent of the songs between which transition takes place, but may for instance be selected from a list of available options. If a decoder performs the method, the selection may be effectuated by a processing component within the decoder. The selection may be random or be related to properties of the songs to which or from which transition takes place. The segment(s) may have been recorded or sampled, and then encoded and stored in a memory. The segment(s) to be added may also be synthesized in real time on the basis of a predetermined set of parameter values or values corresponding to an entry selected from a list.

Advantageously, the transition effects are dynamically adapted to suit an actual physical playback configuration. More precisely, a decoder or other device performing the method may receive an indication of properties of the physical playback sources, either by manual input or automatically. A playback source may include a loudspeaker or a set of headphones. The playback equipment may be characterized by the number of channels, properties of individual physical audio sources, the number of audio sources, the geometric configuration of the audio sources or the like. In a two-channel setting, a simulated motion of a virtual audio source reproducing the entry or exit segment will produce a first pair of waveforms at the points, separated by a first distance, where it is intended to locate physical playback audio sources (e.g., headphones) which is different from a second pair of waveforms occurring a pair of physical playback audio sources separated by a second distance (e.g., a pair of loudspeakers in a room). A dynamical adaptation of the transition effect template may in this case include varying the settings of an acoustic model for computing what effect the virtual audio source has at the points where the physical audio sources are to be located. The adaptation may as well consist in cascading an original transition effect template with a transfer function representing the path between the original playback sources and the alternative sources, e.g., from loudspeakers to headphones. The adaptation may further involve adapting EQ parameters in accordance with the playback source. Methods and devices known from the field of virtual source localization and spatial synthesis for virtual sources may be useful in implementations of this embodiment. This includes the use of head-related transfer functions (HRTFs).

The transition effects may also be dynamically adapted to properties of the current and/or alternative signal. The properties may be determinable by automatic processing (in real time or at a preliminary stage) of the respective signal. Such automatically determinable properties may include tempo, beatiness, key, timbre and beat strength or—for spoken content—gender of speaker, speed, language etc. The properties may also be of a type for which the classification may require human intervention, such as musical genre, age, mood etc. Classification data for properties of the latter type may be encoded in audio metadata related to the signal, whereas properties of the former type may either be determined in real time on the decoder side or encoded in metadata as a result of a preliminary step either on the encoder or decoder side.

The invention and its variations discussed above may be embodied as computer-executable instructions stored on a computer-readable medium.

It is noted that the invention relates to all combinations of features from both aspects, even if recited in different claims.

BRIEF DESCRIPTION OF THE DRAWINGS

Advantageous embodiments of the invention will now be described with reference to the accompanying drawings, on which.

DETAILED DESCRIPTION OF EMBODIMENTS

Figure 1:
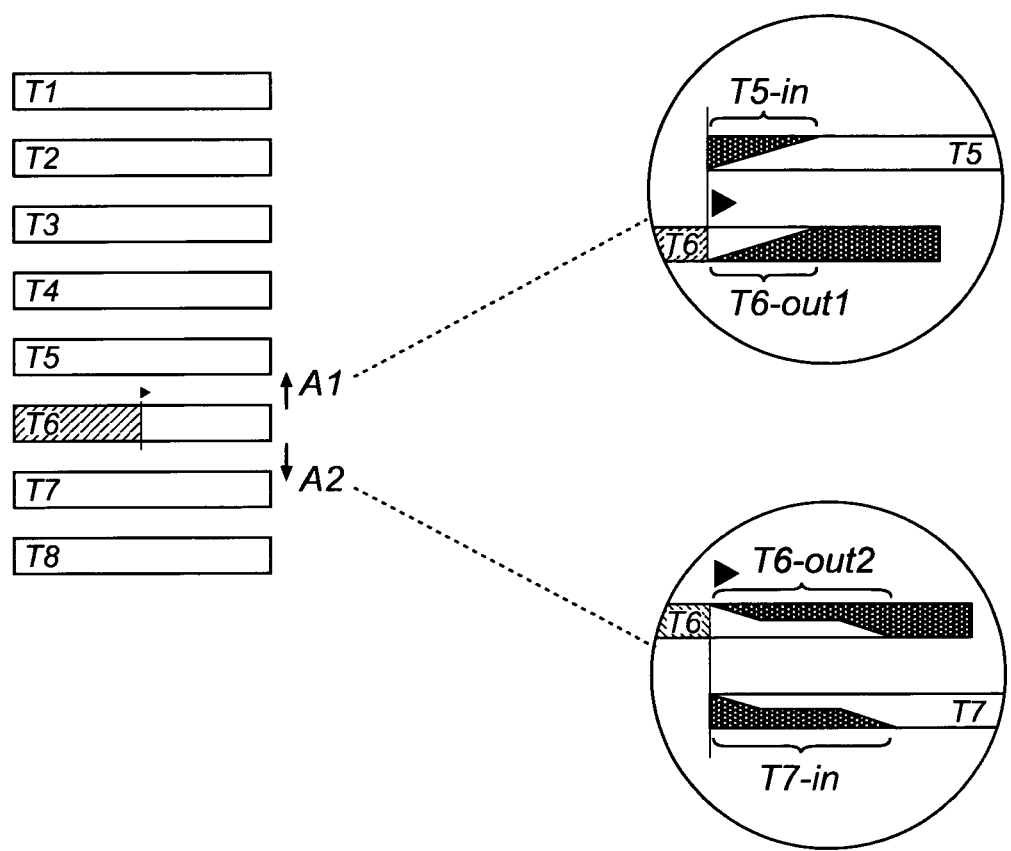
FIG. 1 schematically shows audio signals of finite duration, between which transitions in an "up" and a "down" direction are possible, and where these transitions have been made distinguishable by being associated with distinct transition effect templates.
Figure 9:
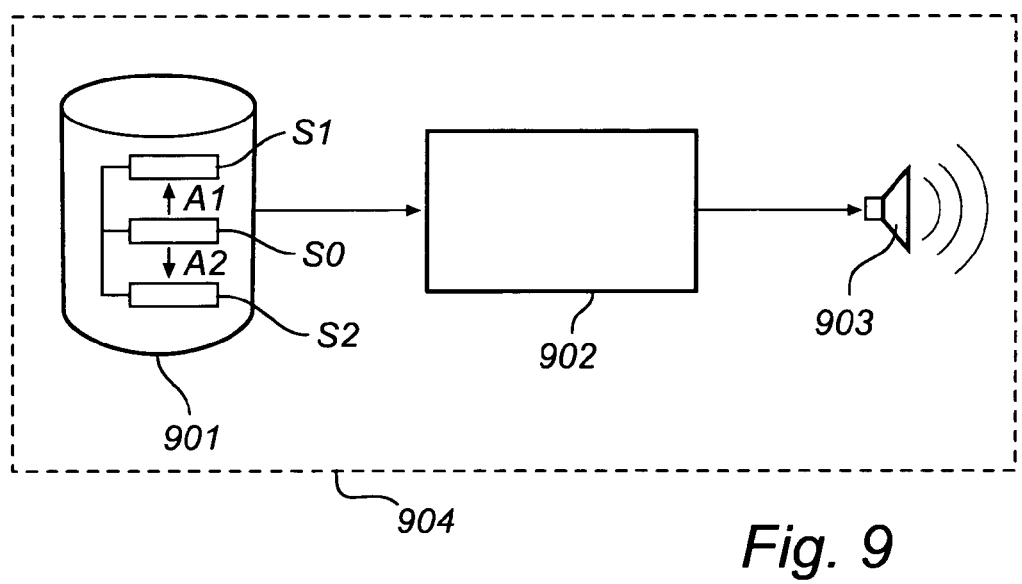
FIG. 9 is a generalized block diagram of an audio player in accordance with the first or second aspect of the invention.

FIG. 1 shows audio entries (or tracks) T1-T8 ordered in a database. The database may or may not have a visual interface for displaying the audio entries and their relationships. In this example intended for illustrative purposes, as shown in FIG. 9, the database is located in a database storage means 901, storing either the actual data or pointers (addresses) to a location where they can be accessed. The database storage means 901 is arranged in a audio player 904 together with a decoder 902 for supplying an audio signal or audio signals to a (physical) playback audio source 903 on the basis of one or more of the database entries T1-T8. For the purposes of this description, the same notation will be used for database entries and audio signals. The database 901, decoder 902 and playback source 903 are communicatively coupled. The playback source 903 may accept the audio signal in the format (analogue or digital) in which it is supplied by the decoder 902, or may also include a suitable converter (not shown), such as a digital-to-analogue converter. The playback source 903 may be arranged at a different location than the decoder 902 and may be connected to this by a communications network. The playback process and the decoding process may also be separated in time, wherein the decoder 902 operates in an offline mode and the resulting audio signal is recorded on a storage medium (not shown) for later playback. The audio player 904 may be a dedicated device or integrated in a device, in particular a server accessible via a communications network, such as the World Wide Web.

As indicated by the triangular play symbol (▶), the decoder 902 is currently playing entry T6 and about half of its duration has elapsed. The audio player 904 is associated with a control means (not shown) enabling a user to browse in a first direction A1 and a second direction A2, whereby playback of either entry T5 or T7 is initiated instead of the currently playing entry T6. The control means may for example be embodied as hard or soft keys on a keyboard or keypad, dedicated control buttons, fields in a touch-sensitive screen, haptic control means (possibly including an accelerometer or orientation sensor) or voice-control means. A user may perform a browsing action by selecting, using the control means, a database entry which is to be decoded by the decoder 902 and give rise to an audio signal or audio signals to be supplied to the audio source 903. The control means may for instance control the database 901 directly in order that it supplies the decoder 902 with a requested alternative database entry or entries. It may alternatively cause the decoder 902 to communicate with the database 901 in order that it supplies the information (i.e., database entry or entries) necessary to fulfill a user request.

In accordance with the first aspect of the invention, the decoder 902 is configured so that at least one browsing direction is associated with a transition effect template for producing a transition effect to be played before normal playback of the alternative database entry is initiated, which then produces an alternative audio signal to be supplied to the playback source 903. In the example shown in FIG. 1, both browsing directions A1, A2 are associated with transition effect templates, according to which an entry segment and an exit segment are extracted and mixed in a specified fashion.

More precisely, a browsing action in the first direction A1 will cause an exit segment T6-out1 to be extracted from the currently playing audio signal T6 and an entry segment T5-in to be extracted from the audio signal T5 located 'before' the currently playing signal T6. The invention is not limited to any particular length of the segments; in a personal music player they may be of the order of a few seconds, whereas in a discotheque more lengthy transitions may be desirable, possibly exceeding one minute in length; transitions that are perceptually very distinctive—as may be the case if they are accompanied by overlaid audio segments—may be chosen to be shorter than a second. In this example, the entry segment begins at the beginning of audio signal T5. As schematically shown in the enlarged portion, the entry and exit segments T5-in, T6-out1 will be mixed in such manner that the total power given to signal T5 is gradually increased and the total power given to signal T6 is gradually decreased. To this end, the decoder 902 includes segment extraction means (not shown) and a mixer (not shown). Information for controlling the mixer forms part of the first transition effect template. As illustrated, the subsequent portion of signal T6 will be completely attenuated or, put differently, will not be used as a basis for providing the transition. As also suggested by the drawing, on which the upper and lower portion of the bars symbolizing the segments are not shaded equally at all points in time, the power distribution applied to each of the entry and exit segment is not symmetric. The asymmetry may for instance refer to the spatial left/right or front/rear directions of a conventional stereo system. In this exemplifying transition illustrates, however, the power distributions of the respective segments T5-in, T6-out1 are symmetric with respect to one another at all points in time.

Similarly, a browsing action in the second direction A2 will cause the decoder 902 and database 901 to generate a transition followed by playback of the audio signal T7 located 'after' the currently playing signal. The transition is controlled by instructions contained in the second transition effect template, which differs to such an extent from the first template that an intended user will be able to distinguish them auditorily in normal listening conditions. According to the second template, entry and exit segments having a different, greater duration are extracted from the audio signals. The second template also defines a different time evolution of the power distribution to be applied to the entry and the exit segments, respectively. Here, both time evolutions include a time-invariable intermediate phase. As suggested by the asymmetry, both segments are then played at approximately equal power but from different directions. In response to this, based on acquired everyday acoustic experience which basically reflects the physical laws governing sound propagation, a listener may experience that a new audio source playing the alternative audio signal T7 enters from one end of the scene while pushing an existing audio source playing the current audio signal T6 towards the other end of the scene; after a short time interval has elapsed (corresponding to the intermediate phase), both audio sources continue their movements so that the existing audio source disappears completely and the new audio source is centered on the scene.

In mathematical notation, an audio signal $y_{01}$ representing a transition generated on the basis of a first transition effect template Tr01 may be written as $$y_{01}(t) = f_{01}(x_0(t+\sigma_{01});t) + g_{01}(x_1(t+\tau_{01});t), 0 \le t \le L_{01},$$

where $f_{01}$ and $g_{01}$ are respective transition functions, which are time-variable in the general case and which control applied channel power and mixing behavior etc.; $x_0$ and $x_1$ are the current audio signal and the first alternative audio signal; $\sigma_{01}, \tau_{01}$ are initial endpoints of the exit and entry segments, respectively; and $L_{01}$ is the duration of the transition. Hence, the first transition effect template may be identified with the 5-tuple $Tr01 = (f_{01}, g_{01}, \sigma_{01}, \tau_{01}, L_{01})$. All five components may be independent of the audio signals $x_0, x_1$. One or more components may also be dynamically adaptable in accordance with one or both audio signals $x_0, x_1$. In particular, the initial endpoints may be chosen with regard to the structure of each audio signal, as may the total duration of the transition. The transition functions may be adaptable, either directly in response to properties of the audio signals or indirectly by stretching to match a desirable transition duration. Similarly to this, an audio signal $y_{02}$ representing a transition based on a second transition effect template Tr02 may be written as $$y_{02}(t) = f_{02}(x_0(t+\tau_{02});t) + g_{02}(x_2(t+\tau_{02});t), 0 \le t \le L_{02},$$

and continuing the analogy the second template may be identified with $Tr02 = (f_{02}, g_{02}, \sigma_{02}, \tau_{02}, L_{02})$. Hence, a pair of transition effect templates may be identified with the ordered pair $T = (Tr01, Tr02)$.

It will be obvious to the skilled person having studied this disclosure that a multitude of pairs of transition effect templates can be designed. Whether or not a proposed pair of transition effect templates will produce distinguishable transitions will in many cases be immediately apparent to the skilled person. In more doubtful situations, one may resort to experiments using representative audio signals for the intended application and a suitable group of trial users instructed to try to distinguish transitions. Conventional statistic methods can be applied in order to establish whether the templates within a proposed pair are sufficiently distinguishable.

Figure 10:
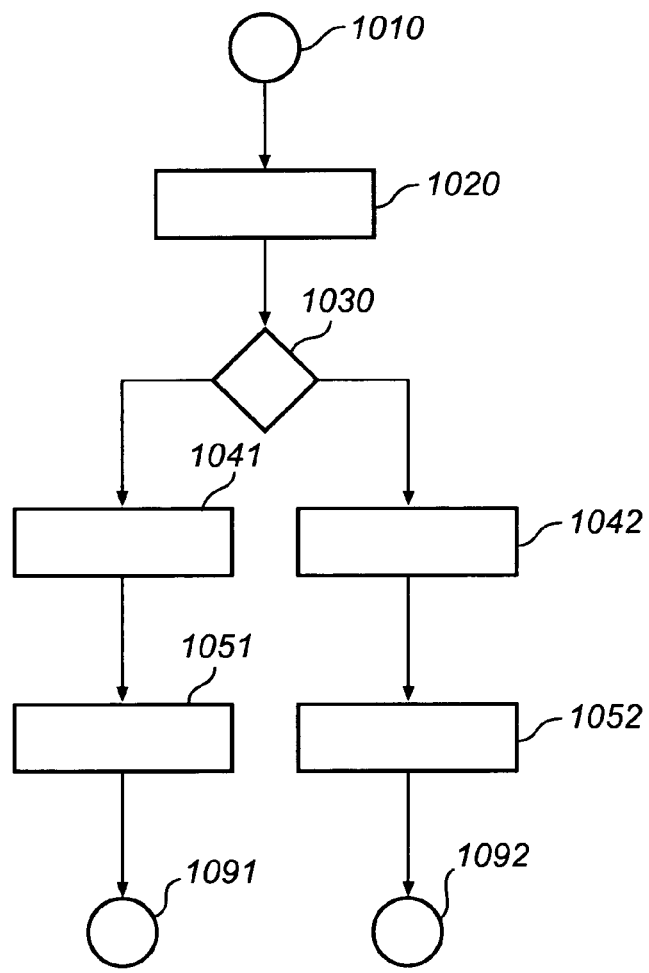
FIGS. 10 and 11 are flowcharts of methods in accordance with embodiments of the first and second aspects, respectively.

The process described above is visualized in flowchart form in FIG. 10. The flowchart illustrates the states of the audio player 904 at different points in time. The process starts in point 1010. In a configuration state 1020, the first and second browsing directions A1, A2 are associated with the first and second transition effect templates, respectively. In a subsequent state 1030, the audio player 904 may receive either a browsing action in the first direction A1, upon which it moves to a first transition state 1041, or a browsing action in the second direction A2, which causes it to move to a second transition state 1042. In the first transition state 1041, the audio player 904 plays the transition generated by mixing an entry segment T5-in and an exit segment T6-out1 in accordance with the first transition effect template. Similarly, the second transition state 1042 is governed by the second transition effect template. After the first (second) transition state 1041 (1042), the audio player 904 enters a first (second) playback state 1051 (1052), in which playback of the first (second) alternative audio signal continues. The process then either receives new user input, such as a transition command, or moves after the playback has been completed to the first (second) end state 1091 (1092) of the process. This process may be embodied as a computer program.

Figure 2:
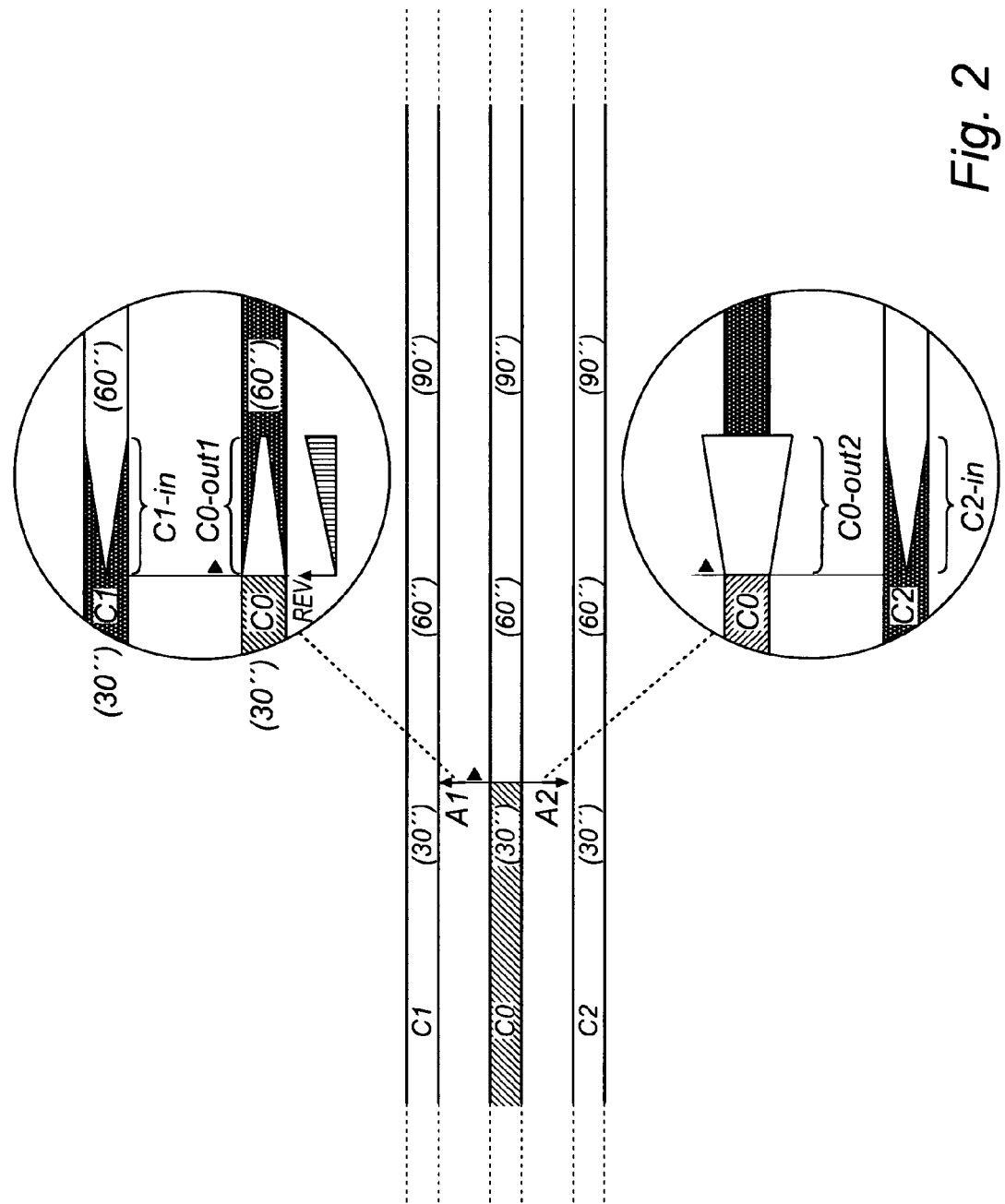
FIG. 2 shows, similarly to FIG. 1, how perceptually different transition effect templates may be used in accordance with the first aspect of the invention to distinguish transitions between streaming audio signals.

The ideas illustrated in FIG. 1 can be generalized to audio signals for which either an initial or a final endpoint is undefined (or unknown), as is often the case of streaming broadcast audio or video channels. The invention can be applied to such signals as well with slight modifications, the main difference being the manner in which entry and exit segments are to be extracted. To this end, FIG. 2 shows three audio signals C0, C1, C2, which are received at a playback device continuously and in real time. The audio signals contain timestamps indicating distances 30, 60 and 90 seconds from some reference point in time. The timestamps are either explicit or indirectly derivable, e.g., from metadata in data packets received over a packet-switched network. The exit segments C0-out1, C0-out2 may be extracted from the current audio signal C0 using the current playback point as a starting point. The entry segments C1-in, C2-in may be extracted in a similar fashion while using a time corresponding to the current playing point as an initial endpoint. An approximation of the time of the current playing point may be derived by interpolation between timestamps in a fashion known per se.

FIG. 2 illustrates a transition effect template associated with the first browsing direction A1, wherein attenuation is gradually and symmetrically applied to the exit segment together with an increasing reverberation effect REV. The increase in reverberation may more precisely correspond to an increase of the wet-to-dry ratio of the first exit segment C0-out1. FIG. 2 also shows another transition effect template, which is associated with the second browsing direction A2. It includes playing the second exit segment C0-out2 at a power that increases gradually from a reference value (e.g., 100%) and then goes to zero abruptly. According to both transition effect templates shown in this figure, the entry segments C1-in, C2-in are played at gradually increasing power until the reference level is reached.

Figure 3:
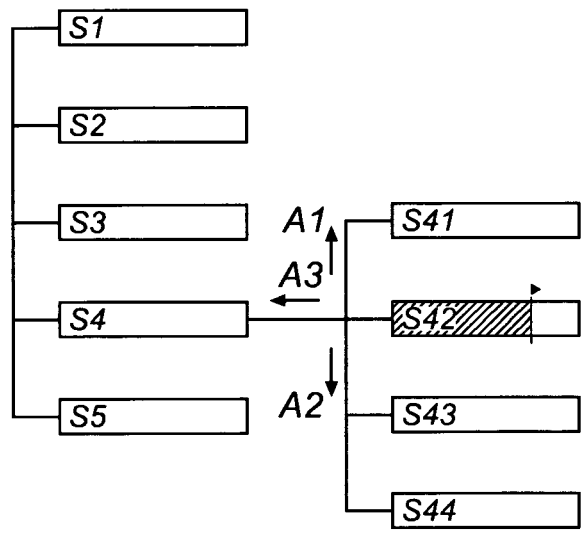
FIG. 3 illustrates a database structure in which it is relevant to distinguish between three different transition directions.

FIG. 3 shows an alternative logical structure of the database 901, wherein database entries (audio signals) are arranged in a two-dimensional matrix allowing browsing in upward, downward and lateral directions A1, A2, A3. The logical structure may correspond to conventional audio distribution formats insofar as S41, S42, S43 and S44 may refer to different tracks in an album and S1, S2, S3, S4, S5 may refer to different albums in a collection. An album may be associated with a representative segment further facilitating orientation in the database, such as a well-known portion of a track in the album. As such, browsing in the lateral direction A3 from the current playing point may initiate playing of such representative segment. After that point, browsing in the upward and downward directions A1, A2 causes switching between representative segments of the respective albums. The inventive concept can be readily extended to include three perceptually distinct transition effect templates for facilitating navigation in the database 901. Extending the inventive concept to four or more distinct browsing directions is also considered within the abilities of the skilled person.

Figure 6:
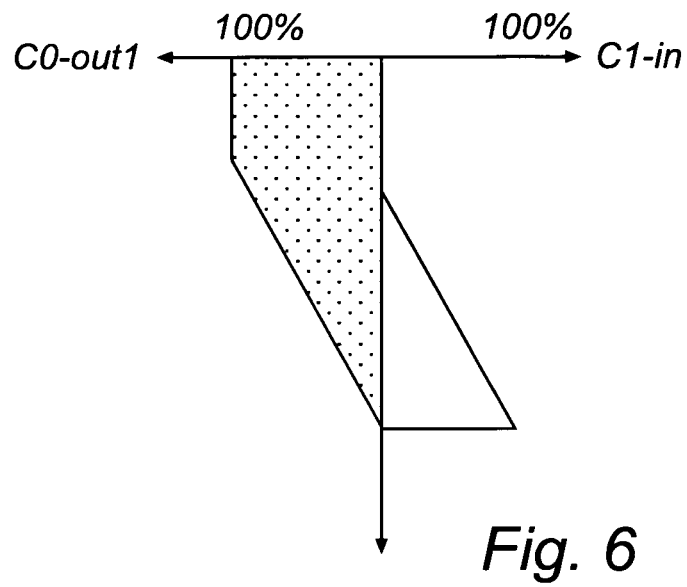
FIG. 6 visualizes a transition effect template in terms of the evolution of respective attenuations applied to the entry segment and exit segment with respect to time (downward direction)

FIG. 6 illustrates mixing information encoded in a transition effect template which is primarily adapted for one-channel playback equipment. As functions of time (downward direction), the figure shows the respective playback powers to be applied to the first exit segment C0-out1 (shaded; left is positive direction; the scale may be linear or logarithmic) and the first entry segment C1-in (non-shaded; right is positive direction; the scale may be linear or logarithmic). The time evolution of each playback power is shown normalized with respect to a reference power level. Put differently, this reference level corresponds to no attenuation and zero power corresponds to full attenuation. As the curves show, the exit segment C0-out1 is played at the reference power at the beginning of the transition, whereas the exit segment is played at the reference power at its end. Each of the power curves increases or decreases in a linear fashion between zero power and the reference power level. In this example, the increase and the decrease phase are not synchronized with each other.

Figure 7A:
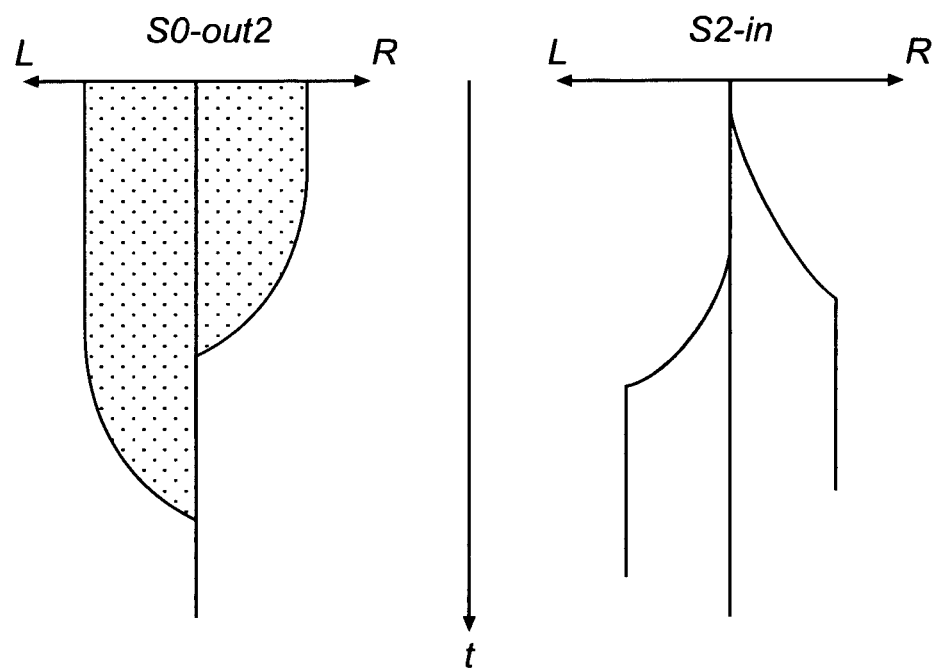
FIG. 7a visualizes, similarly to FIG. 6, another transition effect template, intended for use with a stereo playback equipment and obtainable by simulating movement of virtual audio sources.

FIG. 7a illustrates mixing information relating to another transition effect template, which is primarily adapted for two-channel playback equipment. The figure includes two graphs showing a left (L) and right (R) channel of each of an exit segment S0-out2 (shaded; left is positive direction of left channel, while right is positive direction of right channel; the scales may be linear or logarithmic) and an entry segment S2-in (non-shaded), as well as a common, downward time axis. In addition to the constant and linearly varying behaviors illustrated in FIG. 6, the playbacks powers in FIG. 7a exhibit continuously variable rates of increase and decrease. It will now be explained, with reference to FIG. 7b, how such mixing and attenuation behavior can be obtained by simulating movement of an audio source in relation to an intended listener position.

Figure 7B:
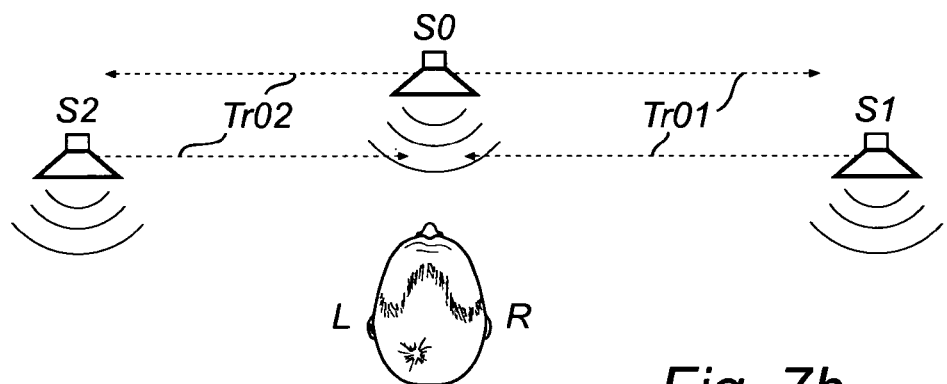
FIG. 7b visualizes the transition effect template of FIG. 7a (as well as a further transition effect template) in terms of a simulation of mobile, virtual audio sources and their geometrical relationship to an intended listener.

In FIG. 7b, a virtual listener with left and right ears L, R is initially located opposite a scene with a virtual current audio source S0 reproducing a current audio signal. As shown by the corresponding arrows, a first transition effect template Tr01 involves removing the virtual current audio source S0 from the scene in the rightward direction; meanwhile, but not necessarily in synchronicity, a virtual first alternative audio source S1 enters the scene from the right. In a second template Tr02, the virtual current audio source S0 exits to the left, while a virtual second alternative audio source S2 enters from the left.

To be precise, the first and second transition effect templates contain information obtainable from simulating the motion to the virtual audio sources as described in FIG. 7b. Such simulation would include a computation, in accordance with a suitable acoustic model, of the waveforms obtained at the locations of the virtual listener's ears as a result of the superposition of the sound waves emitted by the mobile audio sources. The resulting waveforms are to be reproduced by virtual audio sources (e.g., headphones) located approximately at the ear positions. The audio sources S0, S2 are therefore virtual in the sense that they exist in the framework of the simulation, while the headphones, which may be referred to as physical, exist in use situations where the second transition effect template Tr02 is used for providing a song transition. In this example, the acoustic model may preferably take into account the attenuation of a sound wave (as a function of distance), the phase difference between the two ear positions (as a function of their spacing and the celerity of the sound wave, and the ensuing time difference) and the Doppler shift (as a function of the velocity).

It is the second transition effect template that is illustrated in FIG. 7a. The rate of absolute increase or decrease augments gradually and is maximal at the end of the transition. Assuming that the power scale reflects a listener's perception of distance, the transition will suggest that the audio sources undergo a gradually accelerated movement. FIG. 7a does not visualize the phase difference between different channels and/or segments, although such information may nevertheless be included in the transition effect template.

In respect of this and other transition effects obtainable by simulation, it is noted that a transition effect template may either be formulated in terms of geometric or kinematic control parameters to a simulation module (e.g., a spatial synthesis engine, such as an HRTF rendering engine) or in terms of channel power distributions, phase difference data and other pre-calculated information resulting from such simulation. Irrespective of the approach, the information in the transition effect template itself is independent of the audio signals between which transition is to take place. In the first approach, the simulation (which may be implemented in software and/or hardware) is to be executed on every occasion where a transition has been requested, using as input these control parameters and the concerned audio signals. According to the second approach, the simulation module is necessary only at the design stage of the transition effect template, which thus contains parameters intended to control a mixing module or the like.

Figure 8:
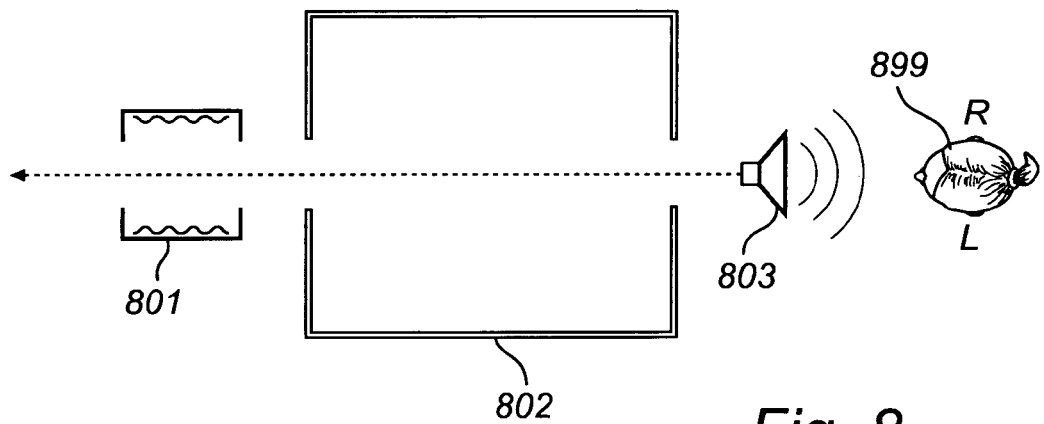
FIG. 8 visualizes a further transition effect template obtainable by simulating movement of a virtual audio source through reverberating spaces with different properties.

FIG. 8 shows an acoustic configuration by which further simulation-based transition effect templates may be obtained. More precisely, the figure shows an audio source 803 adapted to reproduce an entry or exit segment and movable relative to a listener 899 and walls 801, 802 for influencing the reverberation characteristics. A first, semi-closed space is defined by the first set of walls 801, which are provided with an acoustically damping lining. Thus, the first space will be characterized by a dry impulse response. A second, semi-closed space is defined by the second set of walls 802, which are harder than the first set of walls 801 and also enclose a larger volume. The reverberation in the second space will therefore have a longer response time and slower decay. Outside each of the first and second spaces, there remains a third space, which is void of reflective surfaces apart from the walls

801, 802 and which will therefore be more or less reverberation-less. In one embodiment of the invention, this acoustic 'landscape' is input to a simulation module for deriving the waveforms resulting at ear positions of a listener when the audio source 803 is moved along the dashed arrow through the different reverberating spaces. A listener will hear a variable degree of reverberation being applied to the audio signal reproduced by the audio source 803, which (s)he may associate with the disappearance of the audio source 803 and hence, with the end of the playback of the corresponding audio signal. It has been noted that a gradual change in the ratio between a dry (direct) audio component and a wet (singly or multiply reflected) audio component is generally associated with movement or change in distance between audio source and listener.

Figure 4:
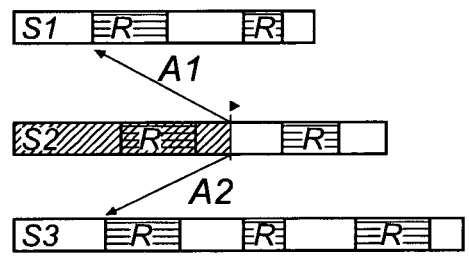
FIG. 4 illustrates browsing between characteristic sections (audio thumb-nails) of audio signals by allowing time markers to guide the extraction of entry segments in accordance with the second aspect.

Turning to the second aspect of the invention, FIG. 4 illustrates how time markers delineating sections of audio signals can be used to enable efficient browsing between the signals by directly jumping to a characteristic portion (audio thumbnail) of a new signal. The figure shows three music signals S1, S2, S3, which have been encoded together with (or have been associated with) time markers in metadata which indicate the locations of choruses (R). An audio player (not shown) currently plays the second audio signal S2 at a point indicated by the triangular play symbol. A user can control the audio player so that it switches to an alternative signal and begins playing this. In the present example, the user can select a first signal S1 (transition A1) or a third signal S3 (transition A2) as alternatives to the currently playing one. The audio player is adapted to begin playback approximately at the beginning of the first chorus section (R) of the selected alternative signal. As will be shown in more detail in FIG. 5, this may include playing a transition in which an exit segment (extracted from the currently playing signal S2) and an entry segment (extracted from the alternative signal) are mixed and wherein an initial or final endpoint of the entry segment coincides with or is related to a time marker indicating the beginning of the first chorus section of the entry segment.

Figure 5:
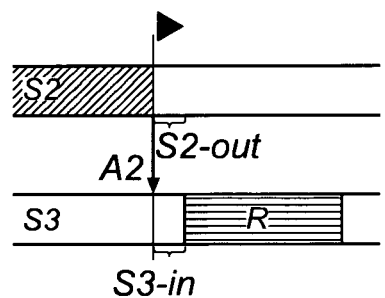
FIG. 5 illustrates, similarly to FIG. 4, browsing between characteristic sections, wherein a time interval is interposed between a section time marker and an endpoint of an entry segment.

FIG. 5 shows an instance of a transition A2 from the second music signal S2 to the third signal. Unlike in FIG. 4, the music signals have been synchronized in time by laterally moving the bars symbolizing the signals, so that synchronous points in the two segments are located side by side, one directly above the other. Further, the exit segment S2-out and the entry segment S3-in have been indicated by braces. The final (right) endpoint of the entry segment S3-in coincides with the beginning of the first chorus of the third music signal S3. This means, after the transition has been accomplished, that playback of the third music signal S3 will be continued from its first chorus. A transition effect template applying an entry segment extracting of this type may be advantageously combined with a conventional fade-in type of channel power evolution with respect to time, such as the one shown in FIG. 1. In a template where the entry segment is played at audible power from an early point in time, one may instead synchronize the initial endpoint of the segment with the beginning of the chorus.

It is also envisaged to use time markers for synchronization with points in an entry segment that are not endpoints. As one example, an entry segment may be extracted in such manner that a time marker is located a predefined time interval $\Delta$ from its initial endpoint, this interval being equal to the duration of a previously obtained (e.g., recorded) segment which is to be superposed on the initial portion of the entry and exit segments by mixing. The superposed previously obtained segment may then function as an introduction to the most characteristic portion of the alternative audio signal. The term "synchronized" is intended to cover such a segment extraction procedure.

The idea of synchronizing segment endpoints with time markers is equally applicable to exit segments. This may be used to enable deferred switching, wherein playback of the currently playing signal is continued up to the end of the current section, which may be a song section, a spoken news item, an advertisement or the like.

There are known methods for automatically detecting the locations of beats in musical content. Transitions between musical signals may be further improved by taking beat points into account in addition to time markers delineating sections. For example, while sections in Western music may generally be identified in terms of bars, time markers having been derived using statistical methods are not necessarily aligned with the bar lines. By extracting entry and/or exit segments beginning or ending at a full bar, the transitions can be made more rhythmical.

Figure 11:
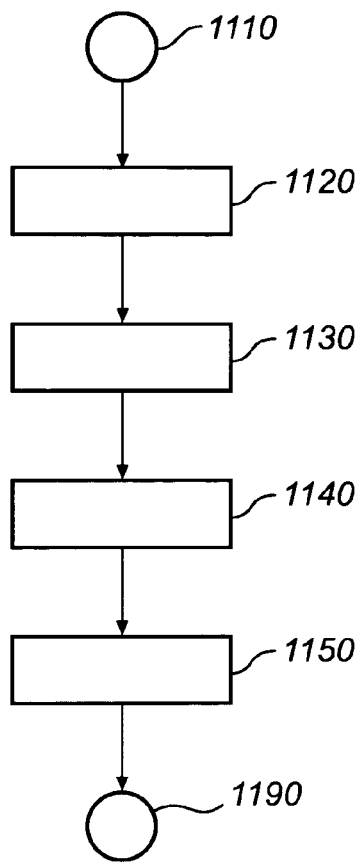

A process in accordance with the second aspect of this invention is illustrated by the flowchart in FIG. 11. Starting from point 1110, the process retrieves time markers from metadata, either from an audio file or bitstream or by contacting an external database, which constitutes a first step 1120. At least the alternative audio signal is associated with metadata containing time markers. In a second step 1130, the method extracts an exit segment and an entry segment from the current and alternative audio signals, respectively, wherein an endpoint of at least one segment is synchronized with a time marker. In a third step 1140, a transition is played during which the exit segment and the entry segment are mixed in accordance with a transition effect template. After this, in a fourth step 1150, the alternative audio signal is played from a point corresponding to the end (i.e., final endpoint) of the entry segment. The process ends at point 1190.

Figure 12:
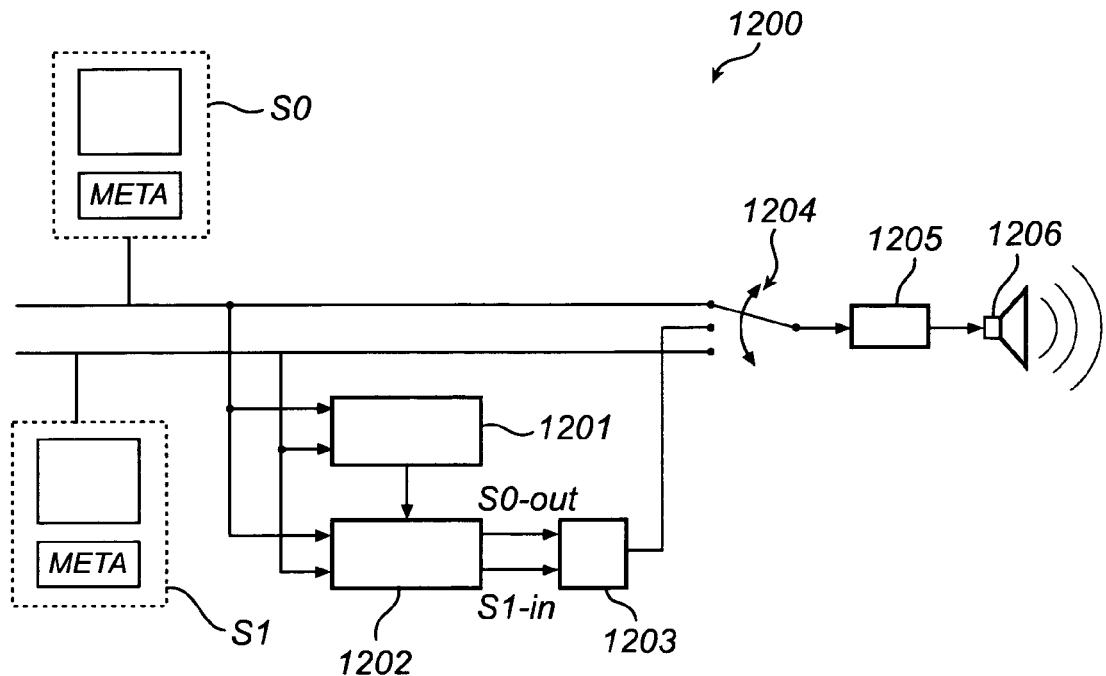
FIG. 12 is a generalized block diagram of a decoder in accordance with an embodiment of the second aspect of the invention.

FIG. 12 shows a decoder 1200 adapted to receive a first and a second audio signal S0, S1, each of which is associated with metadata (META) defining time markers. In practical circumstances, the decoder 1200 may be adapted to receive a first and second audio data bitstream containing such metadata. Using a (physical) playback audio source 1206, a decoding unit 1205 is operable to play either the first or second audio signal or a transition obtained by mixing segments extracted from these. In the example, this is symbolically indicated by a three-position switch 1204 operable to supply the decoding unit 1205 with either the first S0 or second S1 audio data signal or a transition signal obtained as follows. The first and second audio signals are fed in parallel to the switch 1204, to a time marker extractor 1201 and a segment extractor 1202. The time marker extractor 1201 retrieves the time markers and supplies a signal indicative of these to the segment extractor 1202. The segment extractor 1202 is then able to synchronize one or more time instants in a signal, which are indicated by the time markers, with one or more endpoints of an entry or exit segment. The segment extractor 1202 outputs an entry segment S1-in and an exit segment S0-out to a mixer 1203, which passes this on to the upstream side of the switch 1204, making it available for playback. The output signal obtained at the downstream side of the switch 1204 may for instance be supplied to a local or remote playback source, or may be recorded for later playback.

The time marker extractor 1201 may retrieve the time markers by extracting them from the metadata encoded together with the audio data. The metadata may also be fetched remotely from an external database which hosts the metadata and is accessible via a communications network. A well-known example of such external metadata database is Gracenote's CD Database. This may proceed in accordance with the teachings of the applicant's co-pending Provisional U.S. Patent Application No. 61/252,788 filed on 19 Oct. 2009., Pages 16-25 in this related application are of particular relevance for understanding the present invention, and protection is sought also for combinations with features disclosed therein.

Figure 13:
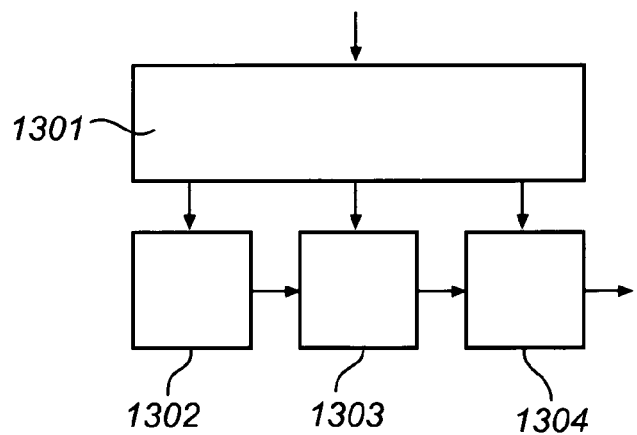
FIG. 13 is a generalized block diagram of a component for extracting a representative segment.

Alternatively, the time marker extractor 1201 may be adapted to determine the time markers (or equivalently, the locations of the sections of the signal) on the basis of the audio signal directly. FIG. 13 shows a possible internal structure of the time marker extractor 1201 in an simplified example embodiment wherein it is adapted to determine the sections in one single audio signal, and therefore has one input only. Reference is again made to the applicant's co-pending Provisional U.S. Patent Application No. 61/428,554 filed on 30 Dec. 2010, and in particular to sections 2, 6, 7, 8 and 10, which describe features that can be advantageously combined with the embodiments disclosed herein. In accordance with the teachings of this related application, such time marker extractor comprises a feature-extraction component 1301 which outputs a signal indicating features from audio data to each of a repetition detection component 1302, a scene-change detection component (which may be embodied as a portion of a more general refinement component) 1303 and a ranking component 1304. In turn, the repetition detection component 1302, the scene-change detection component 1303 and the ranking component 1304 are communicatively coupled. The feature-extraction component 1301 may extract features of various types from media data such as a song. The repetition detection component 1302 may find time-wise sections of the media data that are repetitive, for example, based on certain characteristics of the media data such as the melody, harmonies, lyrics, timbre of the song in these sections as represented in the extracted features of the media data. In some possible embodiments, the repetitive segments may be subjected to a refinement procedure performed by the scene change detection component 1303, which finds the correct start and end time points that delineate segments encompassing selected repetitive sections. These correct start and end time points may comprise beginning and ending scene change points of one or more scenes possessing distinct characteristics in the media data. A pair of a beginning scene-change point and an ending scene-change point may delineate a candidate representative segment. A ranking algorithm performed by the ranking component 1304 may be applied for the purpose of selecting a representative segment from all the candidate representative segments. In a particular embodiment, the representative segment selected may be the chorus of the song.

It is noted that the decoder 902 shown in FIG. 9, which has so far been discussed primarily in connection with the first aspect, may have an internal structure similar to the decoder 1200 in FIG. 12, which the skilled person may therefore rely upon for practicing the first aspect of the invention as well. When used within the first aspect, the time marker extractor 1201 of the decoder 1200 may be inactive or even absent.

Further embodiments of the present invention will become apparent to a person skilled in the art after studying the description above. Even though the present description and drawings disclose embodiments and examples, the invention is not restricted to these specific examples. Numerous modifications and variations can be made without departing from the scope of the present invention, which is defined by the accompanying claims. Any reference signs appearing in the claims are not to be understood as limiting their scope.

The systems and methods disclosed hereinabove may be implemented as software, firmware, hardware or a combination thereof. In a hardware implementation, the division of tasks between functional units referred to in the above description does not necessarily correspond to the division into physical units; to the contrary, one physical component may have multiple functionalities, and one task may be carried out by several physical components in cooperation. Certain components or all components may be implemented as software executed by a digital signal processor or microprocessor, or be implemented as hardware or as an application-specific integrated circuit. Such software may be distributed on computer readable media, which may comprise computer storage media (or non-transitory media) and communication media (or transitory media). As is well known to a person skilled in the art, the term computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Further, it is well known to the skilled person that communication media typically embodies computer readable instructions, data structures, program modules or other data in a modulated data signal such as a carrier wave or other transport mechanism and includes any information delivery media.

The invention claimed is:

1. A method, performed by a device, for providing audio transitions between audio signals during audio browsing, comprising the steps of:
   the device associating a first browsing direction (A1), selected by a user via a control means, for transitioning from a current audio signal (S0) to a first alternative audio signal (S1) with a first transition effect template;
   the device associating a second browsing direction (A2), selected by a user via a control means, which is different from the first browsing direction, for transitioning from the current audio signal to a second alternative audio signal (S2), with a second transition effect template, which is perceptually different from the first transition effect template, wherein the effect is selected from the group comprising simulated motion, simulated Dopper effect, stereo regeneration, spectral band replication, and reverberation; and
   the device playing, in response to a browsing action in one of said browsing directions, a transition in which an exit segment (S0-out1, S0-out2), extracted from the current audio signal, and an entry segment (S1-in, S2-in), extracted from the alternative audio signal, are mixed in accordance with the associated transition effect template; and
   the device subsequently playing the alternative audio signal from the end of the entry segment.

2. The method of claim 1, wherein:
   said steps of playing includes reproducing the entry and exit segments stereophonically using at least two channels;
   the first transition effect template includes using a first exit channel power distribution for the exit segment (S0-out1) and a first entry channel power distribution for the entry segment (S1-in);

the second transition effect template includes using a second exit channel power distribution for the exit segment (S0-out2) and a second exit channel distribution for the entry segment (S2-in);

and at least one of the following holds:
(a) the exit channel power distributions differ by a permutation of at least two channels;
(b) the entry channel power distributions differ by a permutation of at least two channels.

3. The method of claim 1, wherein:
said steps of playing include reproducing the entry and exit segments stereophonically using at least two channels;
the first transition effect template is obtainable by moving an audio source reproducing one of the segments in a first spatial direction relative to a listener;
the second transition effect template is obtainable by moving an audio source reproducing one of the segments in a second spatial direction relative to a listener; and
the first and second directions are distinct.

4. The method of claim 1, wherein at least one transition effect template is obtainable by spatially moving an audio source reproducing said entry segment and/or an audio source reproducing said exit segment relative to a listener.

5. The method of claim 1, wherein:
said step of playing includes reproducing the entry and exit segments stereophonically using at least two channels; and
said transition effect template includes using an exit channel power distribution for the exit segment and using an entry channel power distribution, different from the exit channel power distribution, for the entry segment.

6. The method of claim 1, wherein said transition effect template includes mixing the entry and exit segments with a previously obtained audio segment.

7. The method of claim 1, further comprising
obtaining characteristics of a playback configuration, such as a distance between audio sources reproducing different channels, and/or obtaining characteristics of at least one of the audio signals, such as tempo, beatiness and beat strength,
and adapting said transition effect templates accordingly.

8. A non-transitory computer-readable medium storing computer-executable instructions for performing the method set forth in claim 1.

9. A decoder for outputting audio signals by decoding audio entries in an ordered database permitting browsing in at least a first and a second browsing direction (A1, A2), wherein:
the first and second browsing directions are different, and are respectively associated with perceptually distinct first and second transition effect templates, wherein the effect is selected from the group comprising simulated motion, simulated Doppler effect, stereo regeneration, spectral band replication, and reverberation; and
the decoder comprises one or more processors configured to react to a browsing action, initiated by a user via a control means, in one of said browsing directions by:
initially outputting, from one or more of the processors, a transition signal segment comprising an exit segment (S0-out1, S0-out2), decoded from a current audio entry, and an entry segment (S1-in, S2-in), decoded from an alternative audio entry located in the concerned browsing direction in relation to the current audio entry, mixed in accordance with the associated transition effect template; and subsequently outputting, from one or more of the processors, an alternative signal decoded from the alternative audio entry.

10. An audio player comprising:
an ordered database presenting audio entries and permitting browsing in at least a first and a second browsing direction (A1, A2) wherein the first and second browsing directions are different and are respectively associated with perceptually distinct first and second transition effect templates;
an audio source for reproducing an audio signal; and
the decoder of claim 9, configured to decode entries from the database and to output resulting audio signals to the audio source.

11. A method, performed by a device, for providing a transition during audio browsing, between a current and an alternative audio signal decoded from audio data, wherein perceptually distinct transition effect templates are used for different browsing directions, and
wherein the audio data include time markers pre-determined via an encoding means, and encoded as audio metadata and indicating at least one section of the respective audio signal, wherein the at least one section is representative of the respective audio signal and may correspond to any portion of the respective audio signal;
the method comprising the steps of:
the device retrieving time marking information in the audio data;
the device extracting an exit segment (S0-out1) from the current audio signal and an entry segment (S1-in) from the alternative audio signal, wherein an endpoint of at least one of the segments is synchronized with a time marker;
the device playing, in response to a browsing direction selected by a user via a control means, a transition in which the exit segment and the entry segment are mixed in accordance with a transition effect template, wherein the effect is selected from the group comprising simulated motion, simulated Doppler effect, stereo regeneration, spectral band replication, and reverberation; and
the device subsequently playing the alternative audio signal from the end of the entry segment.

12. The method of claim 11, wherein the endpoint is related to a time marker in one of the following ways:
the endpoint coincides with a time marker;
the time marker refers to a beginning of a segment and the endpoint is located at a time interval before the time marker;
the time marker refers to an end of a section and the endpoint is located at a time interval after the time marker.

13. The method of claim 11, wherein the time markers are endpoints of representative segments extracted by:
assigning a plurality of ranking scores to a plurality of candidate representative segments, each individual candidate representative segment comprising at least one scene in one or more statistical patterns in media features of the audio data based on one or more types of features extractable from the audio data, each individual ranking score in the plurality of ranking scores being assigned to an individual candidate representative segment; and
selecting from the candidate representative segments, based on said plurality of ranking scores, a representative segment.

14. The method of claim 13, wherein each individual ranking score in said plurality of ranking scores comprises at least one component score based on one or more of: duration, a measure for overlapping between different candidate representative segments, time-wise positions of candidate representative segments in the media data, chroma distance, MFCC, spectral contrast, spectral centroid, spectral bandwidth, spectral roll-off, spectral flatness, presence of singing voice, absence of singing voice, one or more rhythm patterns, energy, one or more stereo parameters, perceptual entropy, co-modulation, dynamics.

15. The method of claim 11, wherein the time markers are encoded in a header section of the audio data.

16. The method of claim 11, wherein at least one transition effect template is obtainable by spatially moving an audio source reproducing said entry segment and/or an audio source reproducing said exit segment relative to a listener.

17. The method of claim 11, wherein:
said step of playing includes reproducing the entry and exit segments stereophonically using at least two channels; and
said transition effect template includes using an exit channel power distribution for the exit segment and using an entry channel power distribution, different from the exit channel power distribution, for the entry segment.

18. The method of claim 11, wherein said transition effect template includes mixing the entry and exit segments with a previously obtained audio segment.

19. The method of claim 11, further comprising
obtaining characteristics of a playback configuration, such as a distance between audio sources reproducing different channels, obtaining characteristics of at least one of the audio signals, such as tempo, beatiness and beat strength,
and adapting said transition effect templates accordingly.

20. A non-transitory computer-readable medium storing computer-executable instructions for performing the method set forth in claim 11.

21. A decoder for outputting audio signals by decoding audio data, comprising:

a time marker extractor for retrieving time markers indicating at least one section of an audio signal, wherein the at least one section is representative of the respective audio signal and may correspond to any portion of the respective audio signal;

a segment extractor for extracting an exit segment (S0-out1) from a current audio signal and an entry segment (S1-in) from an alternative audio signal, wherein segment extractor is configured to synchronize an endpoint of at least one of the segments with a time marker;

a decoding unit comprising one or more processors configured i) to play, in response to a browsing direction selected by a user via a control means, a transition, in which the exit segment and the entry segment are mixed in accordance with a transition effect template wherein perceptually distinct transition effect templates are used for different browsing directions, wherein the effect is selected from the group comprising simulated motion, simulated Doppler effect, stereo regeneration, spectral band replication, and reverberation, and subsequently ii) to play the alternative audio signal from the end of the entry segment.

22. An audio player comprising:
an ordered database for storing audio data including time markers encoded as audio metadata and indicating at least one section of the respective audio signal, wherein the at least one section is representative of the respective audio signal and may correspond to any portion of the respective audio signal;
an audio source for reproducing an audio signal; and
the decoder of claim 21, configured to decode entries from the database and to output resulting audio signals to the audio source.

* * * * *